United States Patent [19]

Harris

[11] Patent Number: 5,993,887
[45] Date of Patent: Nov. 30, 1999

[54] SAFE CITRUS JUICE AND PROCESS FOR PREPARATION

[75] Inventor: James W. Harris, Cocoa Beach, Fla.

[73] Assignee: Bioavailability Systems, L.L.C., Cocoa Beach, Fla.

[21] Appl. No.: 09/106,068

[22] Filed: Jun. 29, 1998

[51] Int. Cl.$^6$ .................................................. A23L 1/212
[52] U.S. Cl. ...................... 426/616; 426/333; 426/478; 426/489; 426/599; 424/439; 514/453
[58] Field of Search ...................... 426/616, 599, 426/333, 478, 489; 424/439; 514/453

[56] References Cited

U.S. PATENT DOCUMENTS

| | | |
|---|---|---|
| 4,569,853 | 2/1986 | Strobel . |
| 4,889,739 | 12/1989 | Powers et al. .......................... 426/616 |
| 4,938,985 | 7/1990 | Swaine, Jr. et al. .................... 426/616 |
| 5,260,086 | 11/1993 | Downton et al. . |
| 5,817,354 | 10/1998 | Mozaffar et al. ........................ 426/616 |

FOREIGN PATENT DOCUMENTS

| | | |
|---|---|---|
| WO 98/073332 | 2/1998 | WIPO . |

OTHER PUBLICATIONS

Stephen Cross; Proc. Fla. State Hort. Soc.; "Membrane Concentration of Orange Juice"; 102: 146–152, 1989.

Ernesto Hernandez; J. Agric. Food Chem.; "Ultafiltration of Orange Juice: Effect on Soluble Solids, Suspended Solids, and Aroma"; vol. No. 40, pp. 986–988; 1992.

G. Capannelli; Lebensm.–Wiss. U–Technol.; "Ultrafiltration of Fresh Orange and Lemon Juices"; vol. 25, No. 6, pp. 518–522; 1992.

J.R. Johnson; Journal of Food Science; "Flavor Losses in Orange Juice during Ultrafiltration and Subsequent Evaporation"; vol. 61, No. 3, pp. 540–543; 1996.

E. Hernandez; Journal of Food Science; "Evaluation of Ultrafiltration and Adsorption to Debitter Grapefruit Juice and Grapefruit Pulp Wash"; vol. 57, No. 3, pp. 664–670; 1992.

D.G. Bailey et al.; 1998 "Grapefruit Juice–Felodipine Interaction: Amount and Effect of Active Ingredients in Juice Fractions in Man"; Clinical Pharmacology & Therapeutics, vol. 63, No. 2, PI–99.

S. Ranganna et al; "Citrus Fruits. Part II. Chemistry, Technology, and Quality Evaluation. B. Technology"; CRC Critical Reviews in Food Science and Nutrition; 1983, vol. 19, Issue 1, pp. 1–98.

Fruit Juice Processing Technology; Steven Nagy et al.; "Grapefruit Juice"; Agscience, Inc. Auburndale, Florida; pp. 166–214, 1993.

Kirk–Othmer; 1994 Encyclopedia of Chemical Technology; "Fruit Juices"; vol. 11, Fourth Edition; pp. 1082–1097.

*Primary Examiner*—Helen Pratt
*Attorney, Agent, or Firm*—Oblon, Spivak, McClelland, Maier & Neustadt, P.C.

[57] ABSTRACT

A method of partially or completely selectively removing first-pass effect-reducing particles from citrus juice containing first-pass effect-reducing particles, wherein the particles have a size less than about 500 um and greater than about 25 $\mu$m and citrus juice products made by the method.

16 Claims, No Drawings

SAFE CITRUS JUICE AND PROCESS FOR PREPARATION

FIELD OF THE INVENTION

The present invention relates to a safe citrus juice, preferably a safe grapefruit juice, and process for its preparation. More particularly, the present invention citrus juice contains no or lesser amounts of those compounds responsible for the "grapefruit juice effect".

BACKGROUND OF THE INVENTION

The "grapefruit juice effect" as a well known phenomenon. See *Clinical Pharmacokinetics*, 33, (2), 103–121, 1997, *Clinical Pharmacology and Therapeutics*, 61, (4), 395–400, 1997, *Clinical Pharmacokinetics*, 26, (2), 91–98, 1994, *Clinical Pharmacology and Therapeutics*, 63, (4), 397–402, 1998, *The Boston Globe*, page C1, Dec. 1. 1997, *The Washington Post*, page A11, Aug. 30. 1996, and http:/www.powernetdesign.com/grapefruit. In short, the "grapefruit juice effect" is the common name given to an effect sometimes observed when a patient takes medicine by mouth and, at the same time or about the same time, drinks grapefruit juice. In certain instances depending, it is thought, upon the type of fruit used to make the juice, the processing method used to make the juice, the maturity of the fruit, etc., the grapefruit juice exerts an effect upon the body which somehow prevents the body (presumably the liver and the small intestine) from degrading a medicine as it normally would in the absence of the grapefruit juice. The natural degradation of medicines by the body (occurring soon after the medicine is given) is known as the "first-pass effect", and the reproducibility of the first-pass effect is relied upon by pharmaceutical manufacturers and doctors alike in preparing and prescribing medicines. When grapefruit juice interferes with the first-pass effect and exerts an anti-first-pass effect effect, an amount of the medicine taken which otherwise would be degraded by the body is not degraded by the body. The net result is an amount or concentration of the medicine in the blood which can be dangerously high, even fatal. Because the "grapefruit juice effect" is not reliable, meaning that it is not consistently observed from batch to batch, the problem is heightened.

OBJECTS OF THE INVENTION

It is one object of the invention to address the above-described problem and provide a citrus juice, preferably a grapefruit juice, which is safe to drink even while taking medication.

SUMMARY OF THE INVENTION

The present invention discloses a process for removing from citrus juice, preferably from grapefruit juice, those materials, compounds, etc., responsible for reducing the body's natural first-pass effect. In summary, the present inventor has discovered that the anti-first-pass effect effectiveness of a citrus juice such as grapefruit juice can be significantly reduced simply by removing certain particles of a defined size that are present in the juice.

DETAILED DESCRIPTION OF THE INVENTION

The present invention process for producing a safe or first-pass effect neutral citrus juice comprises removing from citrus juice some or all of those particles, materials, compounds, etc. having a size greater than 75 microns, preferably greater than 25 microns. If desired, particles having a size greater than 500 microns or, a size greater than about 200 microns (i.e. ±10%, such as 212 microns), may be left in the juice or added back to the juice if earlier removed, optionally after washing, etc. if earlier removed.

A preferred citrus juice to be processed according to the invention process is fresh-squeezed citrus juice. As used herein "fresh-squeezed citrus juice" is citrus juice which has not been pasturized or concentrated. The most preferred citrus juice to be processed according to the invention is that juice which eminates directly from the squeezing process (initial citrus juice). While citrus juice which has been pasturized, concentrated, etc. may be used herein they are less preferred especially, if such processing alters the particle-size distribution of the solids present in the juice eminating from the squeezing process. For example, juice that has been concentrated contains small first-pass inhibitory particles and, hence, a wide particle size distribution. Juice which has been squeezed and directly frozen can be used herein after thawing.

The citrus juice to be processed herein may be separated from the fruit (squeezed) in any manner known in the art. For example, simple home hand squeezers may be used where fruit is cut and sheared on a flared post. Alternately, commercial squeezers such as those sold by FMC Inc. AMC, Brown, etc. may be used. See *Fruit Juice Processing Technology*, Nagy, S. et. al. Eds. AGScience, Inc. Auburndale, Florida, 1993, *CRC Critical Reviews in Food Science and Nutrition*, Volume 19, Issue 1, Section IV, and *Fruit Juices*, Kirk-Othmer Encyclopedia of Chemical Technology, 4th Ed., Volume 11, 1994, all incorporated herein by reference.

The present inventor has discovered that the anti-first-pass effect effectiveness of citrus juice is reduced if the juice is filtered, centrifuged, etc. and those materials having a size greater than 75 $\mu$m, preferably greater than 25 $\mu$m, are removed. The present invention has also discovered that if materials having a size of from less than 500 $\mu$m or less than 212 $\mu$m to greater than 75 $\mu$m or greater than 25 $\mu$m are removed from juice that the anti-first-pass effectiveness of the juice is reduced, meaning that the juice does not affect the body with regard to natural drug bioavailability to the extent it did prior to such removal.

Particle removal from citrus juice according to the invention may be accomplished in any manner, including centrifugation, filtration, etc. Filtration through common cotton fabrics including terrycloth has proven effective, but is not the most preferred method. Instead, the preferred method of particle removal is selective filtration. For example, citrus juice, preferably fresh-squeezed citrus juice or initial citrus juice, is passed through a 500 $\mu$m or 212 $\mu$m filter that allows liquid and those particles 500 $\mu$m or less, or 212 $\mu$m or less, pass through. The material passing through the filter is an initial filtrate. The initial filtrate is then passed through a 75 $\mu$m or 25 $\mu$m filter to produce a second filtrate. The particles remaining on the 500 $\mu$m or 212 $\mu$m filter (i.e. materials greater than these sizes) may then be washed with, e.g., water, if desired, and then added to the second filtrate to produce a juice product having reduced anti-first-pass effectiveness.

The filters which may be used herein are not limited. Examples of process filtration equipment include those made by SWECO (Florence, Ky.), The Western States Machine Company (Hamilton, Ohio), Kason Corporation (Millburn, N.J.), TEMA Systems, Inc. (Cincinnati, Ohio), Krauss-Maffei Corporation (Florence. Ky.), and Alfa Laval Separation (Warminster, Pa.). Any filter which excludes particles based on size is acceptable.

As noted above, particles present in citrus juice having a size greater than 212 μm have little to no effect on the ability of the juice to inhibit the first-pass effect. These particles can be important to make juice commercially acceptable, however, and thus may remain in the juice or be added back.

Thus, and in general, the invention process relates most basically to removal from citrus juice of citrus juice particles which, when present, reduce the natural first-pass effect in humans upon drinking the juice (first-pass effect-reducing particles). These particles generally have a size greater than about (±10%) 25, 30, 35, 40, 45, 50, 55, 60, 65, 70, or 75 μm. Grapefruit juice, which can often reduce the natural first-pass effect, is the preferred citrus juice. Those particles greater than about (±10%) 200, 210, 212, 220, 250, 270, 290, 300, 320, 340, 360, 380, 400, 420, 440, 460, 480, or 500 μm may remain in or be added back to the juice if desired, as may various flavors, oils, essences, aromas, etc. known in the art to improve, mask, etc. flavor. Selectively removing particles of from less than 500 μm or less than 212 μm to greater than 75 μm or greater than 25 μm in size is preferred.

Those particles greater in size than about (±10%) 200 μm may be washed if desired if they are to be added back to the juice or otherwise used, preferably with a solvent generally recognized as safe (GRAS) by the Food and Drug Administration. Such solvents include water, ethanol, etc. and the solvent may be heated if desired, used under pressure, etc.

Either the particles greater than about (±10%) 200 μm and/or the juice product of the invention process may be checked for their ability to reduce the natural first-pass effect by determining whether or the extent to which a compound of any one of the following formulae is present:

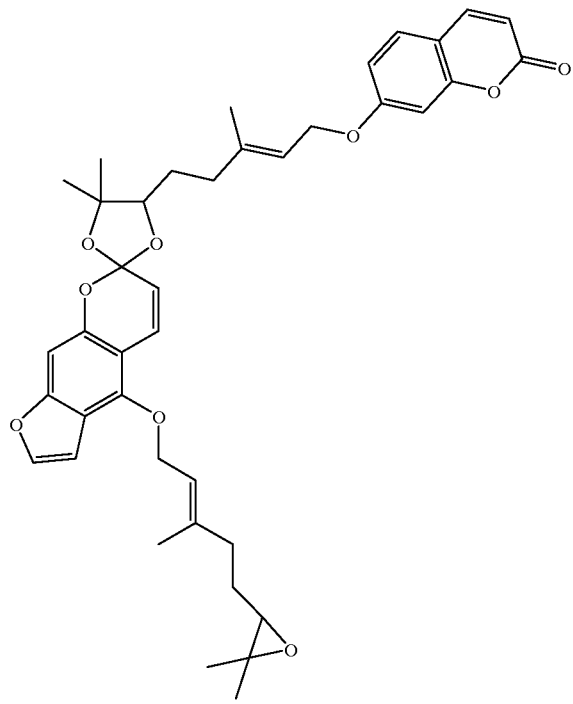

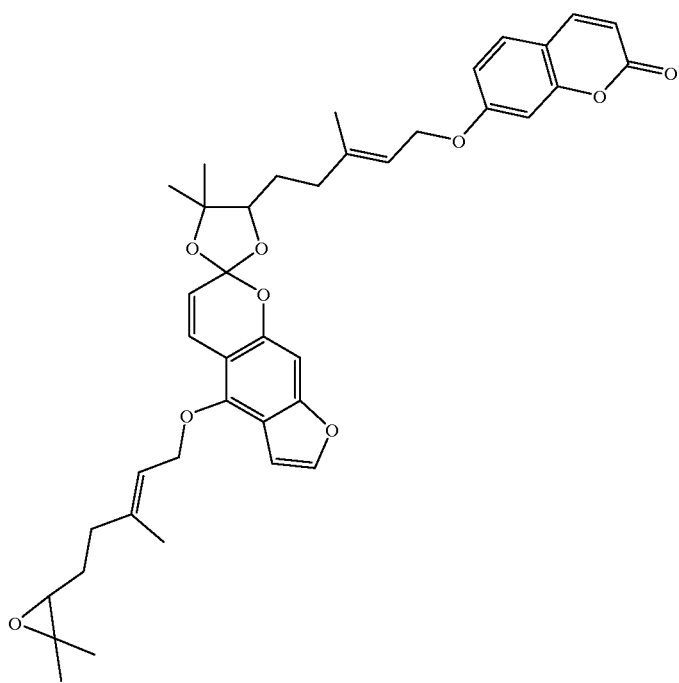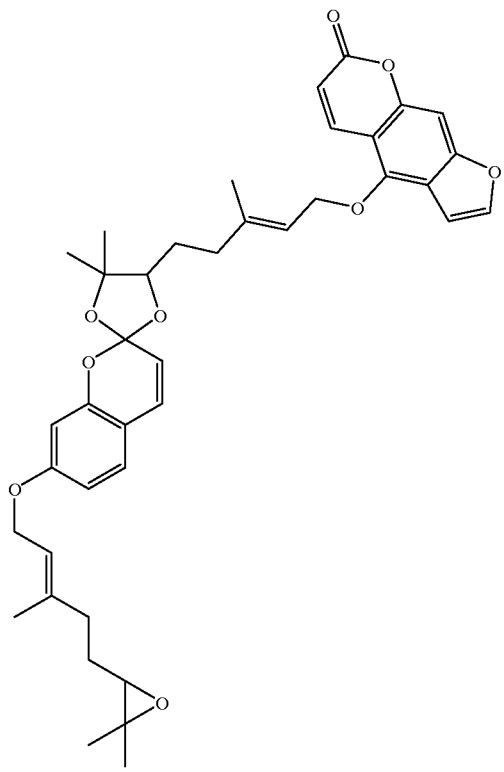

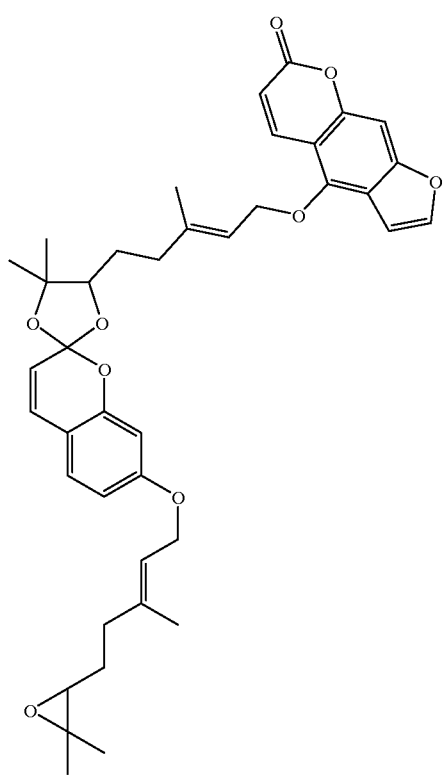
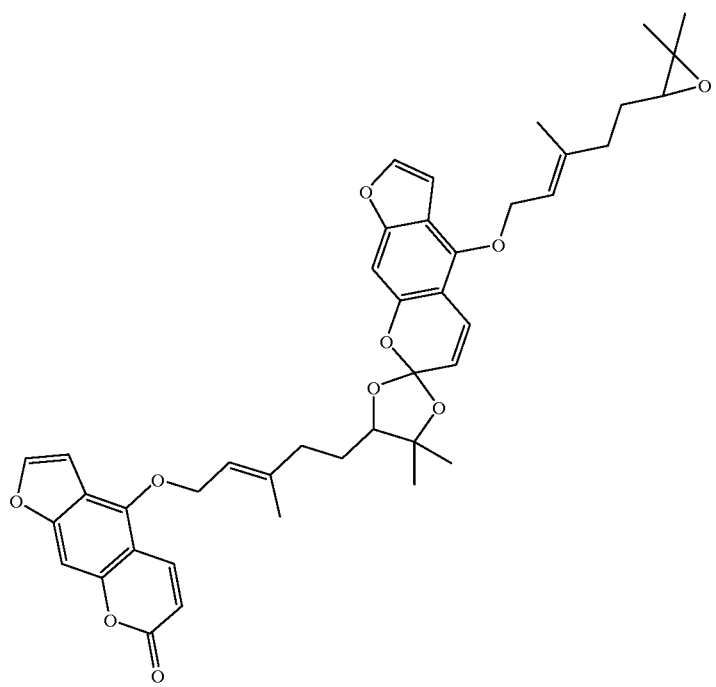

-continued
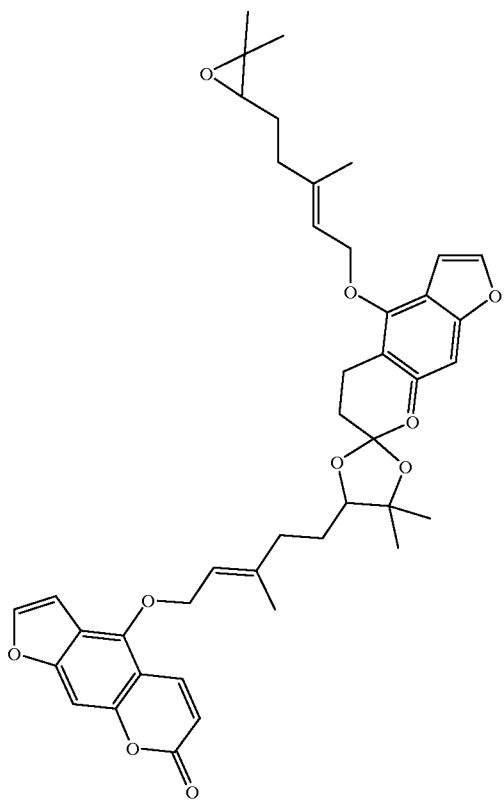
where the latter two formulae and their derivatives appear to dominate in grapefruit juice.
Other such compounds include:
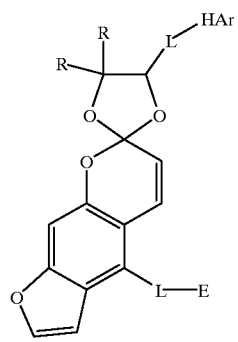
I
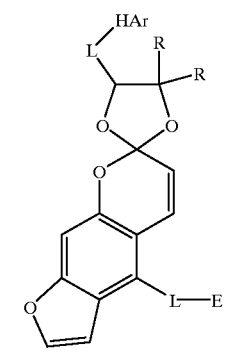
II
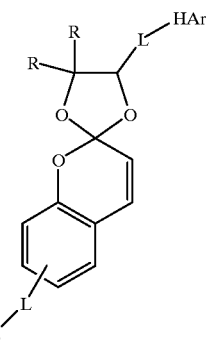
III
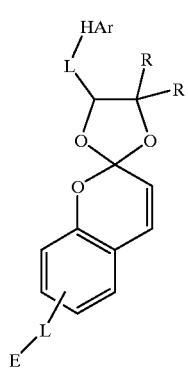
IV
In each of the above structures, R is, independently, H or an optionally substituted $C_1$–$C_{15}$ alkyl group, L is an optionally substituted $C_1$–$C_{15}$ linear or branched, saturated, monounsaturated or polyunsaturated alkyl group optionally interrupted by one or plural nonadjacent sulfur or oxygen atoms and optionally terminated at one or both ends by oxygen, HAr is an optionally substituted $C_6$–$C_{24}$ aromatic group or heteroaromatic group optionally containing one or plural ring atoms selected from the group consisting of N, O, S, and P, and E is —OH, —COOH, —COOR (where R is defined above) or an optionally substituted $C_1$–$C_8$ linear or branched, saturated, monounsaturated or polyunsaturated alkyl group optionally interrupted by one or plural nonadjacent oxygen or sulfur atoms, or E is a $C_3$–C8 optionally substituted cyclic saturated, monounsaturated or polyunsaturated alkyl group optionally interrupted by one or plural nonadjacent oxygen or sulfur atoms, or E is optionally substituted HAr. Preferably, the compounds of Formulae I–IV do not contain a peroxide (0—0) group. Disulfide groups (S—S) are not preferred, but may be present. Preferably E is an epoxide or dihydroxy radical such as —CH(OH)$_2$. E may also be an acid-opened epoxide group.

The compounds of the invention as described above are unlimited with regard to stereochemistry, E–Z isomerism and all possibilities are included. Racemic mixtures are included as are each and every enantiomer and diastereomer.

The groups R, L, HAr, and E may optionally be substituted with a $C_1$–$C_6$ linear, branched or cyclic alkyl group, —OH, a halogen atom, a $C_1$–$C_5$ alkoxy group, a $C_1$–$C_5$ alkyl carbonyloxy group, a $C_1$–$C_5$ alkoxycarbonyl group, etc. Such substituents also may be optionally substituted directly on the ring structures of Formulae I–IV regardless of whether such substituents appear on R, L, HAr or E.

The present inventor has discovered that these anti-first-pass effect compounds, present in citrus juice such as grapefruit juice, provide an anti-first-pass effect. These compounds, their compositions and uses, etc. are the subject of other applications. See USSN 08/997,259 and 09/001,218, both incorporated herein by reference. If any such compounds are present in particles greater in size than about 200 μm, these may be washed as described above until the level of such compound(s) is reduced, and then the particles may be further used or added to juice.

While not bound by any theory, the present inventor believes that the reduction in the first-pass effect by citrus juice is chemically based, and that these chemicals somehow adhere to, are trapped in, etc. particles present in citrus juice of the size described above. For this reason the removal of those particles identified herein from citrus juice reduces the ability of the juice to alter the natural first-pass effect.

The present invention process preferably reduces the ability of a citrus juice to reduce the natural first-pass effect by at least 10%, preferably by at least 50% and more preferably at least 60, 70, 80, 90, 95, greater than 99, and 100% as measured by the chromatography example given below. A removal of 60% or more of those compounds described above from initial citrus juice is simply and easily observed with selective removal of particles greater than 25 or 75 μm in size.

EXAMPLES

Preparation methods of grapefruit juice having reduced anti-first pass effect.

1. Pour a 2.0-L portion of freshly-squeezed grapefruit juice through either a 500 μm or a 212 μm stainless steel testing sieve (VWR Scientific, A.S.T.M. E-11 Specification; 8-inch diameter) to produce an initial filtrate. Gentle rocking of the sieve can increase the flow inch diameter) to produce an initial filtrate. Gentle rocking of the sieve can increase the flow rate through the apparatus. The initial filtrate is then passed through either a 75 μm or 25 μm stainless steel testing sieve to give a second filtrate. Gentle rocking of the sieve can increase the flow rate through the apparatus. The solid material that was trapped by the 500 μm or the 212 μm sieve is washed with three 2.0-L portions of warm or hot water, and the washed material is combined with the second filtrate to give the juice product of the invention process. The taste of the juice product was deemed acceptable by volunteers; some individuals perceived a decrease in bitterness. Samples may be taken at each or any step of the process in order to monitor progress; the samples can be assessed using the methods given below.

2. Pour a 2.0-L portion of freshly-squeezed grapefruit juice through either a 75 μm or a 25 μm stainless steel testing sieve (VWR Scientific: A.S.T.M. E-11 Specification: 8-inch diameter) to produce an initial filtrate. Gentle rocking of the sieve can increase the flow rate through the apparatus. The solid material that was trapped by the 75 μm or the 25 μm sieve is transferred to a 500 μm or a 212 μm stainless steel testing sieve, and the solids are washed with three 2.0-L potions of warm or hot water. Gentle rocking of the sieve can increase the flow rate through the apparatus. The washed material is combined with the initial filtrate to give the juice product of the invention process. The taste of the juice product was deemed acceptable by volunteers; some individuals perceived a decrease in bitterness. Samples may be taken at each or any step of the process in order to monitor progress; the samples can be assessed using the methods given below.

Method for analyzing filtered particles or juice for anti-first-pass effect compound(s).

The large particles (greater than approximately 200 μm or greater than approximately 500 μm) that were removed from a 200-mL portion of grapefruit juice may be assessed for residual ortho ester content (i.e., anti-first-pass effect compounds) by soaking the solids overnight in 200 mL reagent ethanol at room temperature. The solution is then passed through a plug of glass wool, and the resulting filtrate is evaporated in a vacuum concentrator. The residue that remains after alcohol evaporation is extracted with several 3-mL portions of acetonitrile, the acetonitrile solution is passed through a 0.2 μm Teflon filter cartridge, and the acetonitrile is evaporated using a vacuum concentrator. The resulting residue is dissolved in 1.0 mL acetonitrile and is now ready for assessment via the HPLC protocol given below. neutral citrus juice (for definitions, see above) may be assessed for their ortho ester content via the sample preparation protocol that follows. A 200-mL portion of one of the above-named liquids is shaken with 200 mL of ethyl acetate in a separatory funnel. Intractable emulsions are formed often (especially with initial citrus juice), but the emulsion can be removed by passing the mixture through a plug of glass wool and washing the plug with 100 mL ethyl acetate. The aqueous phase is discarded, and the combined ethyl acetate solution is shaken with three 200-mL portions of 5% (w/v) sodium bicarbonate in water. The ethyl acetate is evaporated, the residue that remains is extracted with several 3-mL portions of acetonitrile, the acetonitrile solution is passed through a 0.2 μm Teflon filter cartridge, and the acetonitrile is evaporated using a vacuum concentrator. The resulting residue is dissolved in 1.0 mL acetonitrile and is now ready for assessment via the HPLC protocol given below.

The HPLC conditions given below are preferred. Linear gradients are used for elution and are formed by mixing mobile phase A composed of water with mobile phase B composed of acetonitrile (instrument: Hewlett Packard). The elution time, in minutes, as well as the percentage of acetonitrile present in the mixed mobile phase are as follows: 0, 10; 5, 10; 30, 80; 40, 80; 41, 95; 50, 95; 53, 10; 60, 10. The chromatographic column has dimensions of 150 mm length×2.0 mm internal diameter, is packed with C18 bonded to 4 $\mu$m silica particles (14% carbon load; YMC, Inc.), is protected with a 2 mm internal diameter column packed with a proprietary material (Prism, Keystone Scientific, Inc.) and with a PTFE filter, and is maintained at 35±0.2° C. The flow rate is maintained at 0.20 mL/minute during the 60 minute run cycle. The column eluate from each 10 $\mu$L injection is monitored for absorbance at 400±200 nm, at 310±2 nm, and at 240±2 nm. Although additional ortho esters are found occasionally, the most prominent ortho esters present in grapefruit juice elute at approximately 36.1, 47.0, and 48.6 minutes, and these compounds may be quantitated using either peak heights or integrals. The spiro ortho esters are readily distinguished from the coumarins and furocoumarins that are also found in grapefruit juice because of the presence of a strong absorption near 244 nm in the UV spectra of the ortho esters that is due to the benzofuranyl moiety adjacent to the ortho ester.

I claim:

1. A method comprising partially or completely selectively removing first-pass effect-reducing particles from citrus juice containing first-pass effect-reducing particles, wherein said particles have a size less than about 500 $\mu$m and greater than about 25 $\mu$m.

2. The method of claim 1, wherein said particles have a size less than about 200 $\mu$m and greater than about 25 $\mu$m.

3. A citrus juice produced according to the method of claim 2.

4. The method of claim 1, wherein said particles have a size less than about 200 $\mu$m and greater than about 75 $\mu$m.

5. A citrus juice produced according to the method of claim 4.

6. The method of claim 1, wherein said particles have a size less than about 500 $\mu$m and greater than about 75 $\mu$m.

7. A citrus juice produced according to the method of claim 6.

8. The method of claim 1, wherein said juice is fresh-squeezed citrus juice.

9. A citrus juice produced according to the method of claim 8.

10. The method of claim 1, wherein said juice is initial citrus juice.

11. A citrus juice produced according to the method of claim 10.

12. The method of claim 1, further comprising flavor-enhancing said citrus juice after removal of said particles.

13. A citrus juice produced according to the method of claim 12.

14. A citrus juice produced according to the method of claim 1.

15. The citrus juice of claim 14, wherein said citrus juice is grapefruit juice.

16. The method of claim 1, wherein said citrus juice is grapefruit juice.

* * * * *